United States Patent [19]
Ashkin

[11] 3,808,550

[45] Apr. 30, 1974

[54] APPARATUSES FOR TRAPPING AND ACCELERATING NEUTRAL PARTICLES

[75] Inventor: Arthur Ashkin, Rumson, N.J.

[73] Assignee: Bell Telephone Laboratories, Incorporated, Murray Hill, N.J.

[22] Filed: Jan. 24, 1972

[21] Appl. No.: 219,941

Related U.S. Application Data

[63] Continuation-in-part of Ser. No. 885,070, Dec. 15, 1960, Pat. No. 3,710,279.

[52] U.S. Cl. ........... 331/94.5, 250/41.9 SE, 250/42, 176/1
[51] Int. Cl. ............................................. H01s 3/05
[58] Field of Search ....... 250/41.9 SE, 42; 331/94.5; 176/1

[56] References Cited
UNITED STATES PATENTS
3,489,645  1/1970  Daiber et al. ........................... 171/1

OTHER PUBLICATIONS
Rawson et al., "Applied Physics Letters," Vol. 8, No. 4, Feb. 15, 1966, pp. 93–95, QC 1 A 47.
Waniek et al., "Int'l. Aerospace Abstracts," 1968, p. 1192, (abstract only).
Weichel et al., "Applied Phys. Letters 13," (11) December 1968, pp. 376–379.

*Primary Examiner*—David Schonberg
*Attorney, Agent, or Firm*—W. L. Wisner

[57] ABSTRACT

There is disclosed a variety of apparatuses for controlling by radiation pressure the motion of a particle free to move with respect to its environment, based on the discovery that one or more beams of coherent optical radiation can overpower gravity and thermally induced reaction (photophoresis) forces on a small particle. The disclosed results of the effect of the radiation pressure on the motion of the particle include controllably heating the particle to provide a blackbody point light source, bombardment of a sample target with small particles, very high-energy particle acceleration, strong-focusing acceleration of a neutral particle, vacuum deposition of thin films from ultrapure particles controllably vaporized while held by radiation pressure, tensile-strength testing of materials based on the radiation-pressure effect of circularly polarized light, and acceleration measurement for inertial guidance and measurement of very low gas pressures.

9 Claims, 15 Drawing Figures

APPARATUSES FOR TRAPPING AND ACCELERATING NEUTRAL PARTICLES

CROSS-REFERENCE TO RELATED APPLICATION

This application is a continuation-in-part of my application, Ser. No. 885,070, filed Dec. 15, 1969 now U.S. Pat. No. 3,710,279.

BACKGROUND OF THE INVENTION

This invention relates to the controlled use of the effects of radiation pressure upon particles free to move with respect to their environment, especially neutral particles.

Historically, radiation pressure is a physical effect that has been occasionally studied in the laboratory, but has been usually considered to be of no practical interest because of the obscuring effects of thermal forces. These thermal forces are caused by temperature gradients in the medium surrounding an object and, in general, are termed radiometric forces. When the gradients are caused by light specifically and the resulting thermal force moves the entire particle, the effect is called photophoresis. Radiometric forces and photophoresis, in particular, are usually orders of magnitude larger than the force due to radiation pressure. Even in the typical experiment with a laser radiation source, photophoresis usually completely obscures radiation pressure. For example, see the article by A. D. May et al., *Journal of Applied Physics*, Vol. 38, page 5290 (1967).

It has been postulated by A. V. Kats et al., *JETP Letters*, Vol. 9, page 192 (1969), that radiation pressure can deform so-called free surfaces of a liquid in opposition to surface-tension forces.

Recently, it has been proposed to deflect at least a portion of a molecular beam by radiation pressure. See U.S. Pat. No. 3,558,877 to Jerome Pressman, in which that technique is proposed for isotope separation. That technique is applicable to deflection of beams of neutral molecules or particles, unlike earlier techniques such as that of the V. Vali et al. U.S. Pat. No. 3,360,733.

I have discovered a broader range of uses of radiation pressure. In my above-cited copending parent patent application, emphasis is placed upon novel, laterally constricted embodiments for isotope separation or particle separation.

Nevertheless, it is desirable to apply radiation pressure techniques to more versatile manipulation or acceleration of particles, especially one at a time.

SUMMARY OF THE INVENTION

I have discovered that a vertically directed, diverging coherent beam of a selected transverse mode structure can support against gravity and trap a substantially transparent or reflective particle that is substantially larger in diameter than the wavelength of the beam. A Gaussian-mode beam is used with a transparent particle; and a doughnut-mode beam is used with a reflective particle.

More generally, according to my invention, such a beam in any orientation can trap a particle in cooperation with an opposed restoring force. The particle can be moved about by moving that beam or another intersecting beam or can be accelerated out of the trap by the other beam.

According to a subsidiary feature of my invention, the particle can be launched from a dielectric support, on which it is held by Van der Waals' forces, by propagating an acoustic pulse through the support while the principal beam shines through the support.

Advantageously, in my experiments radiometric effects such as photophoresis were avoided by supplying relatively transparent particles in relatively transparent media or in a partial vacuum, or by controlling the heating of slightly absorptive particles. A very low pressure gaseous medium has been found to supply desirable gaseous damping. I was able to obtain substantial freedom from deleterious thermal effects at power densities 1,000 times the power densities of the above-cited A. D. May et al. reference.

According to other aspects of my invention, it is feasible to utilize radiation-pressure effects by controlling the heating of the particle or the thermal interaction of the particle and its environment, even when thermal effects are not substantially absent. For example, a high-intensity black-body point source of light suitable for use in a spectrometer can be provided in an apparatus based on this aspect of my invention.

Various specific features of my invention also stem, in part, from an appreciation of the large magnitude of force achievable by radiation pressure from a coherent light source as contrasted to an incoherent light source and from an appreciation of the variety of its uses when disturbing thermal effects are avoided or suitably controlled.

Specifically, I have found that in many species of my invention it is advantageous to provide an environment around the neutral particle or particles such that thermal effects influence the motion of the particle substantially less than the effect of the radiation pressure.

According to one subsidiary feature of my invention, two or more beams of substantially monochromatic coherent diverging light are supplied to a region of mutual intersection or overlap in order to increase the restoring forces on a trapped particle that is subject to disturbances. The additional beams of coherent light are particularly advantageous for use in implementing an automatic feedback control system that senses the oscillatory motions resulting from the disturbances and varies the magnitude of the restoring forces to damp the oscillatory motions.

According to another subsidiary feature of my invention, another beam of substantially monochromatic coherent light is controlled and directed upon the trapped particle to accelerate it out of the trapping region toward a suitable target. Thus, such acceleration of particles can be made to simulate the effects of micrometeoroids in outer space and micrometeorites which fall to earth, to induce high-energy chemical interactions or to generate certain types of useful signals.

According to still another subsidiary feature of my invention, radiation pressure can be selectively employed to impart angular momentum from the light photons to trapped particles. In one exemplary embodiment of my invention, this effect is employed to test the tensile strength of materials in an environment which can be rendered free of contamination and other spurious effects or to measure very small amounts of optical absorption.

BRIEF DESCRIPTION OF THE DRAWING

Many other species, features and advantages of my invention will become apparent from the following detailed description, taken together with the drawing, in which.

DESCRIPTION OF ILLUSTRATIVE EMBODIMENTS

Theoretical and Experimental Basis of the Invention

One of my typical experiments uses transparent polystyrene spheres of 0.59 microns and 1.31 microns diameters and polyvinyltoluene spheres of 2.68 microns diameter in pure water in a suitable cell having glass walls. A $TEM_{oo}$ mode beam of an argon ion laser of radius $W_o = 6.2$ microns and a wavelength $\lambda = 0.5145$ microns was focused horizontally through one of the walls into the cell. The beam traversed a pathlength of 120 microns in the cell. The results were observed by eye through a microscope and an eye-protecting filter. The beam was manipulated to strike single particles. When a beam of milliwatts of power hit a 2.68 micron particle off center, the particle was simultaneously drawn in toward the beam axis and accelerated in the direction of the light beam with a terminal velocity of microns per second until it hit a wall of the glass cell, where it then remained trapped in the beam. If the beam was then blocked, the particle wandered away from the trapping site by Brownian motion. Similar effects occurred with the smaller particle sizes but required more power for the same velocity.

The differences in the accelerations of the different-sized transparent particles were dramatically illustrated when they were mixed throughout the water solution and then the beam was directed to strike many of them upon its passage through the cell. The beam then preferentially accelerated 2.68 micron particles and tended to leave the 0.585 micron particles behind. This experiment illustrates the separation of particles based on optical cross section and differs from an ultracentrifuge in that its force falls more slowly with particle size. It also illustrates that radiation pressure and not convection is the driving mechanism, since convection could not separate the particles in this manner.

Figure 4:
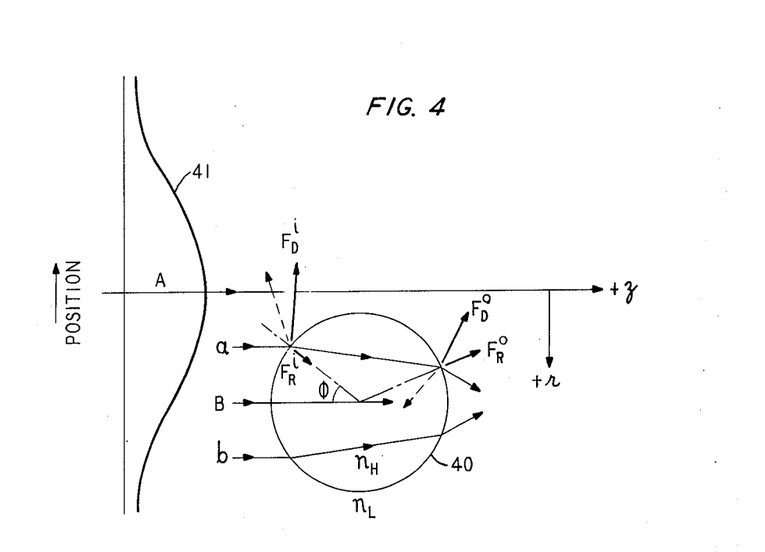
FIG. 4 shows an exemplary force diagram for a typical transparent neutral particle controlled according to the techniques of the invention.

The particle velocities and the trapping of the particles on the beam axis can be accounted for in detail with reference to the force diagram of FIG. 4. Let us assume that the index $n_H$ of the spherical particle 40 is 1.58. The curve 41 at the left-hand side of FIG. 4 illustrates the intensity of the light beam propagating along the axis A for various cross-sectional positions without the beam indicated in the vertical direction. It will be seen that the spherical particle 40 is situated off the beam axis in water of index $n_L = 1.33$. Consider the stronger ray $a$ of a typical pair of rays, $a$ and $b$, symmetrically situated about the center of this sphere. The ray $a$ undergoes Fresnel reflection and also refraction (called a deflection here) at both the input and output surfaces of particle 40 along its propagation path. The reflections give rise to radiation pressure forces $F_R{}^i$ and $F_R{}^o$ (the input and output reflection forces). It will be noted that each of these reflection forces bisects the exterior obtuse angle between the incident and reflected components at the respective one of the surfaces. The deflections further give rise to radiation pressure forces $F_D{}^i$, $F_D{}^o$ (the input and output deflection forces). It will be noted that each of these deflection forces bisects the exterior obtuse angle between the incident and deflected components at the respective one of the surfaces, as shown. Let us adopt cylindrical coordinates such that the direction of the beam is the $+z$ direction and the transverse coordinate is $r$, radially out from the beam axis A. Although the magnitudes of the forces due to ray $a$ vary considerably with the angle $\Phi$ (the angle between the incident direction of propagation and the sphere radius to the point of incidence), qualitatively, the results are alike for all $\Phi$. The transverse (in the coordinate $r$) components of $F_D{}^i$ and $F_D{}^o$ are much larger than $F_R{}^i$ and $F_R{}^o$. In fact, they are about 10 times larger for $\Phi = 25°$. All of these forces contribute to acceleration in the direction of propagation of the beam. $F_R{}^i$ and $F_R{}^o$ have transverse components which approximately cancel, to the first order; $F_D{}^i$ and $F_D{}^o$ add in the transverse direction and are in the transverse direction toward the center of the beam, that is, toward $-r$; and the net transverse force due to ray $a$ is in the $-r$ direction. By an analogous argument, the symmetrical weaker ray $b$ gives a net force along the $+z$ direction of propagation of the beam and a net outward but weaker transverse force. Thus, this spherical particle 40 as a whole is accelerated inward and forward, as observed. Thus, we see that when $n_H$ is larger than the index $n_L$ of the surrounding medium that the net transverse (radial) force for the stronger ray is inward toward higher light intensity.

The radiation-pressure force in general is given by $$F_{rad} = (2qP)/(c), \quad (1)$$

where $P$ is the total power of radiation striking the particle, $c$ is the velocity of light, and $q$ is the fraction of light effectively reflected back from the particle.

to compute the $z$ component of the radiation-pressure force when the particle 40 is on the axis of the beam, one integrates the incremental $z$ forces of the plane polarized beam over the surface of the sphere. This integration yields a force for which the $q$ in Equation (1) is equal to 0.062, in a typical experimental case. From this force or the $q$ value, we can derive the limiting velocity $v$, in a medium of viscosity $\eta$ by Stokes' law:

$$v = (2qPr)/(3c\pi w_o^2 \eta) \quad (2)$$

where $w_o$ is the radius of the waist of the beam.

For 19 milliwatts of power in the laser beam and a spherical particle 40 of radius 1.34 microns in water, for which $\eta$ is $1 \times 10^{-2}$ poises, I compute $v = 29\mu$/sec, whereas I measured $26 \pm 5\mu$/sec. These results show good agreement.

In the foregoing experiment, the spherical particle 40 acts as a focusing lens. A similar analysis shows that if the relative magnitudes of the indices of the media are reversed, the spherical particle becomes a diverging lens, the signs of the radial deflection forces reverse, and the spherical particle is pushed outward from the center of the beam. This prediction was checked experimentally in the extreme case of a low-index spherical particle in a high-index medium, namely, an air bubble in a high-index liquid. Bubbles, about 8 microns in diameter, were generated by shaking a high viscosity medium consisting of an 80 percent by weight mixture of glycerol in water. It was found that the bubbles were always pushed out of the light beam as they were accelerated along, as expected. In the same mixed medium having an index $n_L = 1.44$, the 2.68 micron spherical particles of index $n_H = 1.58$ still behaved in a focusing manner and are drawn inward toward the axis of the beam as they were accelerated along.

A further basic experiment involving 2.68 micron spherical particles in water in a glass-walled cell demonstrated trapping of substantially transparent particles with just two opposing beams which are shaped by lenses positioned to form the beam waists well before the trapping region, so that the beams were strongly divergent. The two beams were aligned to be approximately collinear. Particles that drifted near either beam were drawn in, accelerated to the region of substantially equal and opposite radiation pressures, were then decelerated by the counter-acceleration of the opposing beam, and eventually brought to rest by viscous damping in the region of nearly equal radiation pressures, which was a region of stable equilibrium. The stability of a particular particle in this region was checked by interrupting one beam and allowing the particle to accelerate rapidly in the remaining beam. When the opposing beam was again turned on, the particle returned to the equilibrium region more slowly than it left it in a single beam, since it was acted on only by the differential radiation-pressure force. Interrupting the other beam reversed the behavior of the particle. These particles are damped by viscous forces and have a limiting velocity in the water depending on the magnitude of the force.

In other experiments, roughly 2.5-micron-radius water droplets from an atomizer were accelerated with a single argon-ion laser beam at a power level of 50 milliwatts; and velocites of about 0.25 cm/sec were observed. Such motions could be seen with the naked eye. The behavior of the water droplets was in qualitative agreement with theoretical calculations.

In these experiments it is clear that I have discriminated against radiometric forces, particularly photophoresis. These forces push more strongly on hot surfaces and would push high-index spherical particles and bubbles out of the beam, contrary to my experimental observation that the high-index spherical particles are drawn into the beam. Even the observed direction of acceleration along the beam axis is the opposite of the radiometric prediction. According to the principles of radiometric effects, a moderately focusing sphere concentrates more heat on the downstream side (with respect to light propagation) of the spherical particle. The particle should therefore move upstream into the light (negative photophoresis). From similar theoretical considerations and calculations for water droplets in air, I have confirmed that photophoresis could account for the observed results only if temperature gradients existed across each water droplet which can, in fact, not be sustained. Accordingly, my experiments demonstrate that I have successfully controlled radiometric effects and rendered them subordinate to, or less effective than, the radiation-pressure effects which I employ in my invention.

A Spectrometer Light Source

Figure 1:
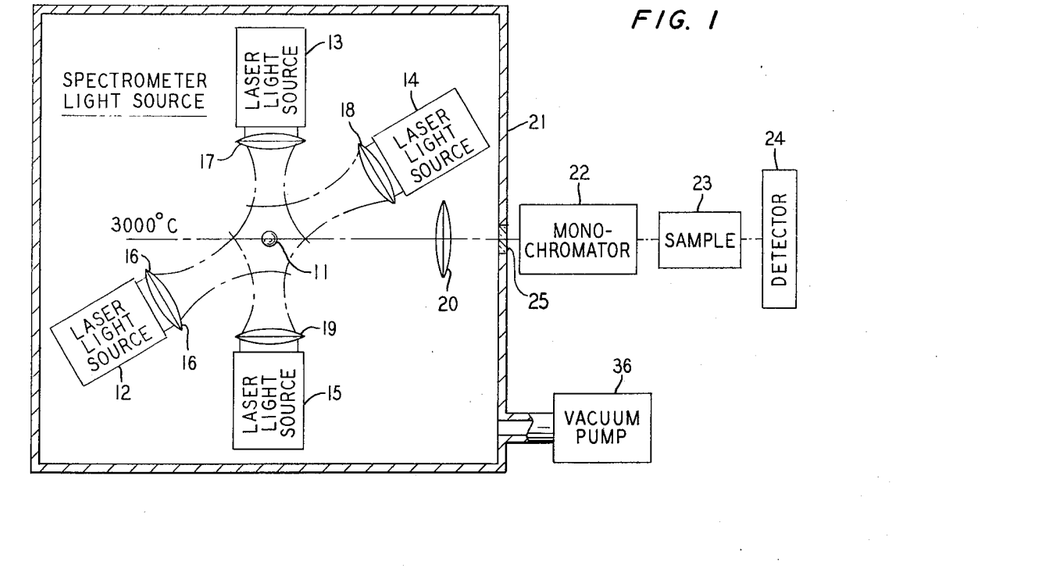
FIG. 1 is a partially pictorial and partially block-diagrammatic illustration of a first illustrative embodiment of the invention providing a new type of light source for a spectrometer.

In the embodiment of FIG. 1 a tungsten spherical particle 11 is trapped by radiation pressure in a stable optical potential well formed by the diverging intersecting beams from the tetrahedrally arranged laser sources 12, 13, 14 and 15. It is first introduced into this potential well in the presence of gas, which provides viscous damping of its motion; and then the gas is pumped out. If a regular tetrahedron were sketched around particle 11, that tetrahedron could be oriented so that each of the laser beams was orthogonal to a different one of its four surfaces. When tungsten spherical particle 11 has a diameter approximately equal to the wavelength of the continuous-wave laser light from sources 12–15, for example, at 1.06 microns, approximately 1 milliwatt of power from each of the laser sources is sufficient to heat particle 11 to a temperature near its melting point, specifically, to about 3,000° C. Since particle 11 is no broader than a wavelength of the light it acts as essentially a point source of black-body radiation which extends from the far infrared through the infrared, the visible, the ultraviolet and the hard ultraviolet regions of the electromagnetic spectrum. Such a point source of light is ideal for use in a spectrometer.

More specfically, in vacuum, achieved in containing means 21 by vacuum pump 36, the particle 11 will eventually heat to the temperature at which it can be cooled by thermal radiation. At this temperature, which depends on the absorption of particle 11, a stable equilibrium of temperature will be reached and an intense, continuous, incoherent light source of the type just specified is achieved. The exact band of blackbody radiation available can be controlled by controlling the excitation level of sources 12–15, by changing the angle of divergence of the beams or by changing the lenses 16, 17, 18 and 19, to place the beam waists nearer or farther from the potential well. A thin inert gas atmosphere could also be employed about particle 11, since in FIG. 1 the photophoresis forces substantially cancel. Such a gaseous atmosphere would damp oscillations of the particle caused, for example, by random fluctuations in the laser power.

This light source may be integrated into a spectrometer by passing a portion of the radiation from particle 11 through a collecting lens 20, a spectrometer slit 25 in containing means 21, a monochrometer 22, a sample 23 to be tested, and a spectrometer detector 24 arranged in tandem in that order. Illustratively, monochrometer 22 is a conventional variable monochrometer, for example, of the type employing a rotatable diffraction grating and an output slit through which a different single light frequency will pass depending on the monochrometer setting (grating angle).

In operation, the transmission of sample 23, which could be unknown crystal, is tested throughout all of the infrared, visual and ultraviolet frequency bands in one continuous spectrum scan. Typically, the output of detector 24 during such a scan could be recorded to provide a permanent record. With respect to the operation of the light source itself, it should also be noted that the tungsten spherical particle 11 is trapped by the four intersecting beams despite the fact that it does not transmit any of the radiation and therefore does not experience several of the forces illustrated in FIG. 4. It is for this reason that a minimum of four diverging monochromatic light beams are used to form the optical potential well instead of only the two such beams which were sufficient in one of the above-described experiments with substantially transparent particles.

Figures 1A, 1B:
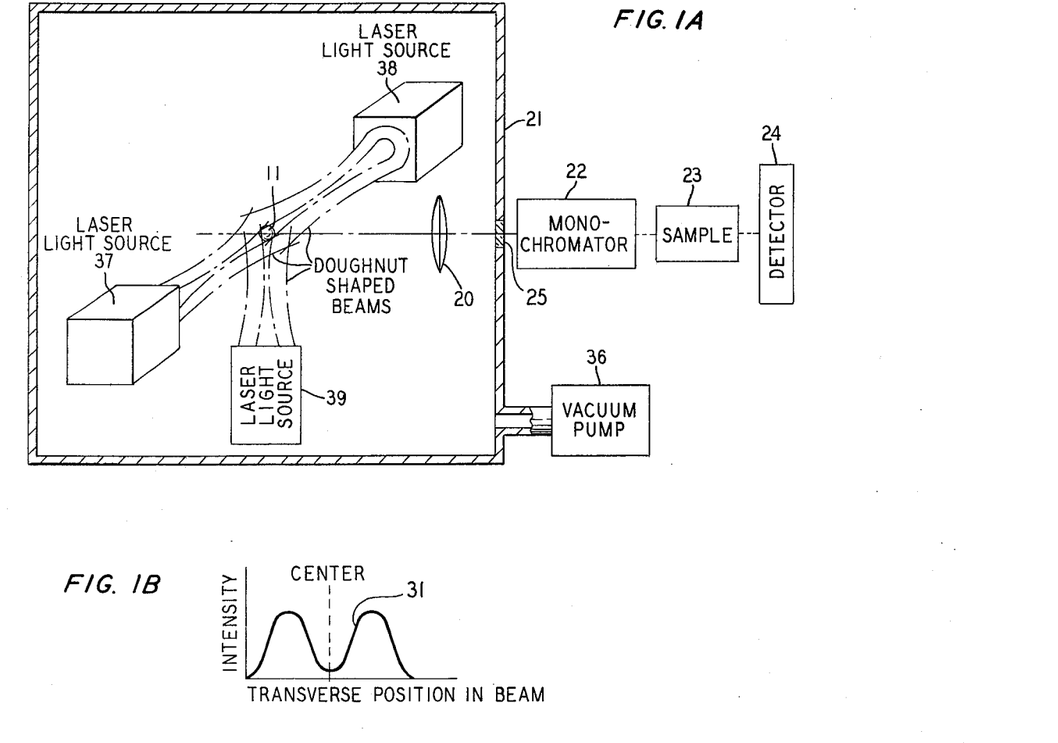
FIG. 1A shows a modification of the embodiment of FIG. 1.
FIG. 1B is a graph showing the transverse mode structure of the supporting beam in the modified embodiment of FIG. 1A.

Alternatively, two opposed beams each in a $TEM_{01}$-in-space-quadrature mode (doughtnut-shaped mode) will generate forces effective to hold such a metallic particle, as illustrated in the modified embodiment of FIG. 1A.

In the modified embodiment of FIG. 1A, the reflective particle 11 is supported from below against the opposed force of gravity by a beam from laser source 39 having a doughnut-shaped mode. The horizontally opposed beams from laser light sources 37 and 38 provide additional stability in the position of particle 11. In each case, the beam is diverging in the vicinity of particle 11 so that its radiation pressure force decreases in the direction of propagation to provide a stable equilibrium of forces along the common axis of two opposed beams.

Lateral stabilization of the particle 11 is provided by the doughnut-mode shapes of the beams.

The variation of intensity of each beam as a function of the transverse position in the beam is shown in curve 31 of FIG. 1B. The region of relatively low intensity in the center provides an optical "trap" for the reflective particle, with respect to its motions transverse to the beam. This trapping occurs because a reflective particle in the coherent beam experiences a transverse force directed out of the region of high intensity. In other respects, the embodiment of FIG. 1B is like that of FIG. 1.

Figure 11:
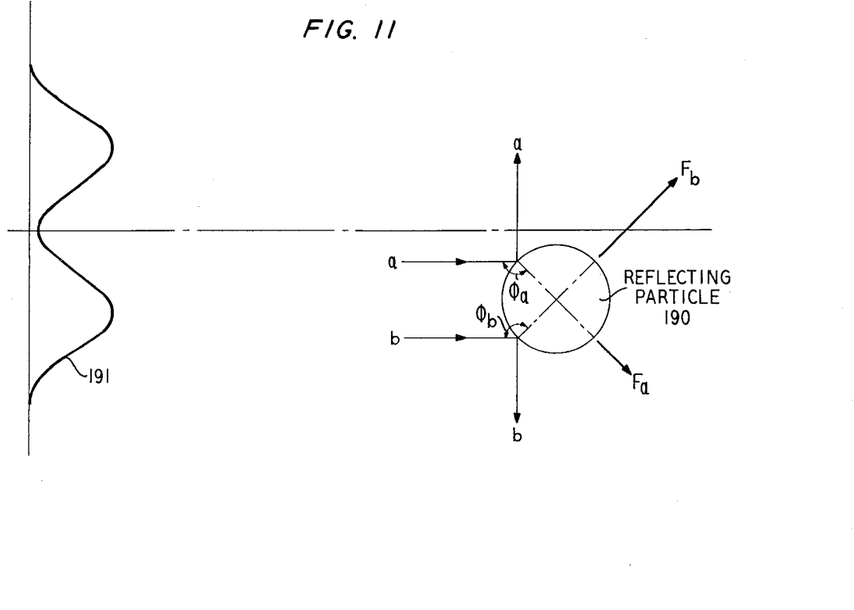
FIG. 11 shows a modification of the explanatory force diagram of FIG. 4 to be applicable for a reflective particle.

The forces on particle 11 in FIG. 1B may be understood in more detail with reference to FIG. 11.

The explanatory diagram of FIG. 11 assumes that the coherent light beam propagates to the right centered on the indicated center line to the left of reflective particle 190. The beam has a transverse variation across its cross section as indicated by curve 191, the ordinate of which indicates intensity and the abscissa of which indicates distance from the center line. This variation of intensity is circularly symmetrical about the center line. The particle 190 is illustratively a reflective spherical particle having a diameter several times larger than the wavelength of the light of the beam.

Consider the weaker ray $a$ of a typical pair of rays, $a$ and $b$, symmetrically situated about the center of this spherical particle. The ray $a$ undergoes reflection at the point at which its propagation path intersects the surface of particle 190. The reflection gives rise to radiation pressure force $F_a$, in the direction of the momentum change of the light. It will be noted that force $F_a$ bisects the exterior obtuse angle between the incident and reflected portions of ray $a$. Although the magnitude of $F_a$ varies considerably with the angle $\Phi_a$, where $\Phi$ is the angle between the incident direction of propagation and the sphere radius to the point of incidence, the results are qualitatively similar for all $\Phi$. $F_a$ increases as $\Phi$ increases, for a constant-intensity level of the incident light, e.g., the intensity of a given ray $a$.

By an analogous argument, the stronger ray $b$ produces a larger force $F_b$ because of its greater intensity.

The components of forces $F_a$ and $F_b$ are numerically additive in the direction of light propagation. The components are numerically subtractive in the direction transverse to the light propagation and produce a net force inward toward the center of the beam. Thus, the reflective particle 190 tends to stay centered in the beam and will eventually experience mainly a force in the direction of the beam.

The embodiments of FIGS. 1 and 1A also provide a good illustration of the principle that it is merely necessary to control the thermal effects on the particle or particles subjected to radiation pressure. It is not always necessary to render the thermal effects negligible. Thus, in the embodiments of FIGS. 1 and 1A, the thermal effects is put to good use in providing a black-body radiation, while radiation pressure is usefully employed to hold the particle 11 stable in an environment substantially free of any contamination and substantially free of disturbing convective forces.

A Neutral Particle Gun

Figure 2:
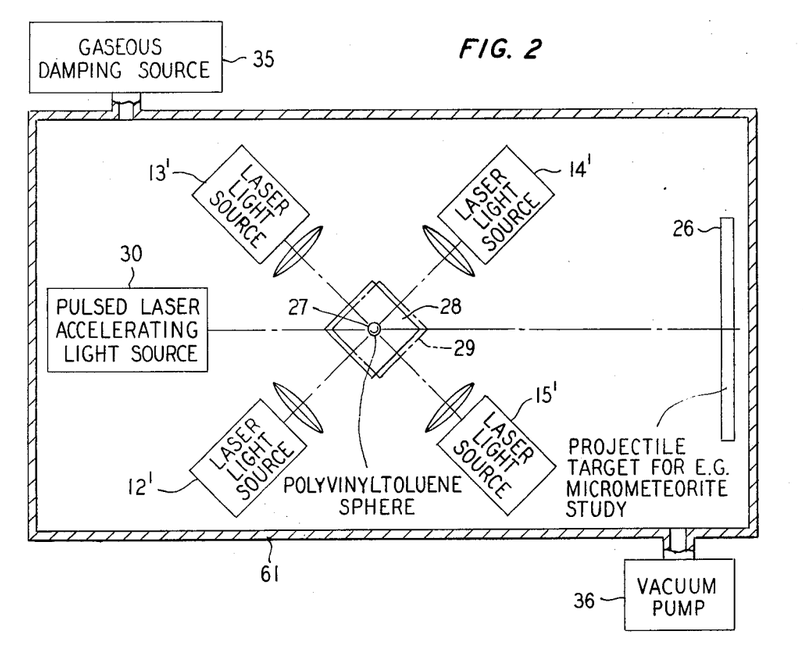
FIG. 2 is a partially pictorial and partially block-diagrammatic illustration of a second embodiment of the invention employed for a study of simulated micrometeoroids.

In the embodiment of FIG. 2, radiation pressure is employed to fire neutral particles at a projectile target 26, such as a stainless steel target which may be proposed for a space exploration machine in which it will be subjected to micrometeoroid impact. The object of this embodiment is to simulate the impact of micrometeoroids on the projectile target 26.

For this purpose, the entire apparatus of FIG. 2 would preferably be enclosed in a conventional vacuum chamber 61 in order to eliminate the disturbing effects of air. For the purpose of illustration, a typical polyvinyltoluene spherical particle 27, illustratively about 3 microns in diameter, of which many are introduced into the vacuum chamber, may be held by six cubically arranged diverging laser beams from sources 12' through 15', 28 and 29, the latter laser source being in front of particle 27 and, for reasons of convenience of illustration, therefore not shown. The waists of the focused beams occur before the beams reach the potential well, as in my above-described experiments. It should, of course, be clear that, if particle 27 is at least a few microns in diameter, the radiation-pressure gradients in the diverging beams are such that it can be held with only one or two of sources 12', through 15', 28 and 29, and that the other four could be eliminated. The use of three beams is described hereinafter with reference to FIG. 2A. Preferably, each of sources 12' through 15', 28 and 29 supplies about 0.1 watt each of continuous-wave power at 0.5145 micron. A gas environment from source 35 is used initially to provide damping and then is pumped out by pump 36. Any sort of particle, whether transparent or not, can be held in a stable optical potential well by all six of these sources, given appropriate transverse mode structures of the beams.

A pulsed laser 30 is disposed along a clear line of sight extending through particle 27 toward target 26 and is pulsed to produce a strong, brief light beam when it is desired to fire particle 27 at target 26. It should be noted that the shorter the wavelength of light of source 30, the stronger is its directional control over the path of the accelerating particle 27. Nevertheless, for the purposes of illustration, I have calculated that a single pulse from a ruby laser operating at 0.6943 micron will accelerate particle 27 to a final velocity between $1 \times 10^5$ cm/sec and $1 \times 10^6$ cm/sec, which is high micrometeorite velocity, insofar as they have been detected on earth. The high velocity particle 27 would dissipate its kinetic energy by impact with target 26; and the firing of a sufficient number of such particles in succession will provide the desired simulation of the outer space environment.

Moreover, with respect to the practical details of the portion of the embodiment of FIG. 2, it should be noted that the particles are introduced into the optical potential well by an initial mechanism providing damping, as the gas damping technique described above. The particles could be carried in by a gas stream to the region of intersection of the laser beams.

Figure 2A:
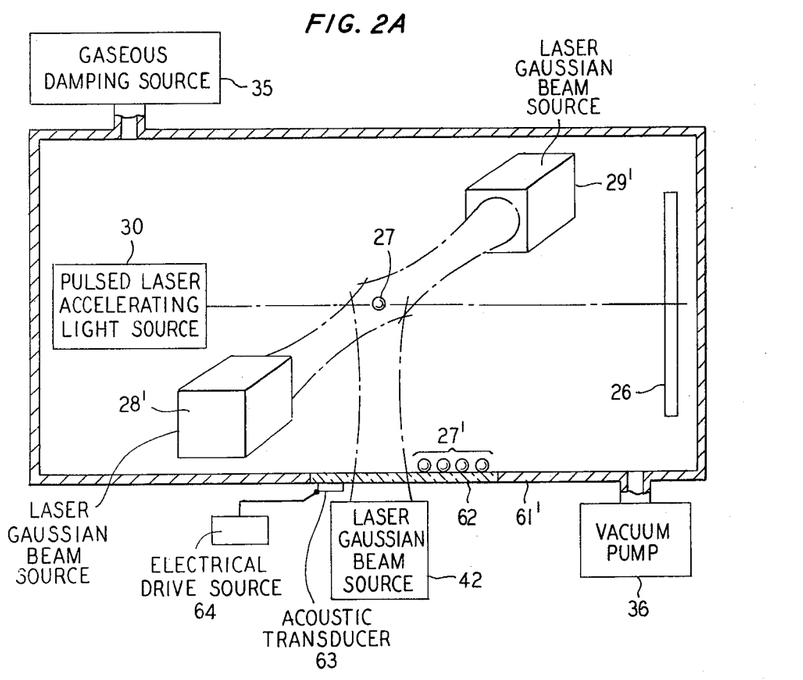
FIG. 2A shows a modification of the embodiment of FIG. 2.

In the modified embodiment of FIG. 2A, the polyvinyltoluene particle 27 is held by just three diverging Gaussian laser beams from sources 42, 28' and 29', the latter two of which are horizontally opposed. The beam from source 42, disposed outside the vacuum chamber 61', lifts particle 27 from the glass plate 62 in the bottom wall of chamber 61' after particle 27 has been shaken loose from plate 62 by an acoustic pulse launched into plate 62 by transducer 63 driven by the electrical source 64. The acoustic pulse breaks Van de Waals' forces between the particle and the plate 62. The particle 27 rises in response to radiation pressure from the beam from source 42 against the force of gravity until vertically trapped by the horizontally opposed beams from sources 28' and 29'.

The particle 27 tends to be centered in all three beams in response to three sets of forces of the type illustrated in FIG. 4. Overshoot of the equilibrium position and oscillator motions are damped by a gaseous atmosphere, as in FIG. 2. The gas is then pumped out alternatively, without gaseous damping, the oscillatory motions may be damped by appropriate feedback control of the intensities of the beams.

The pulsed laser 30 then accelerates particle 27 toward target 26 by radiation pressure.

A substantially transparent particle such as the polyvinyltoluene particle 27 can be easily constrained in a positive fashion in all three dimensions by just two bidirectional intersecting laser beams within the respective optical resonators of two lasers.

Figure 10:
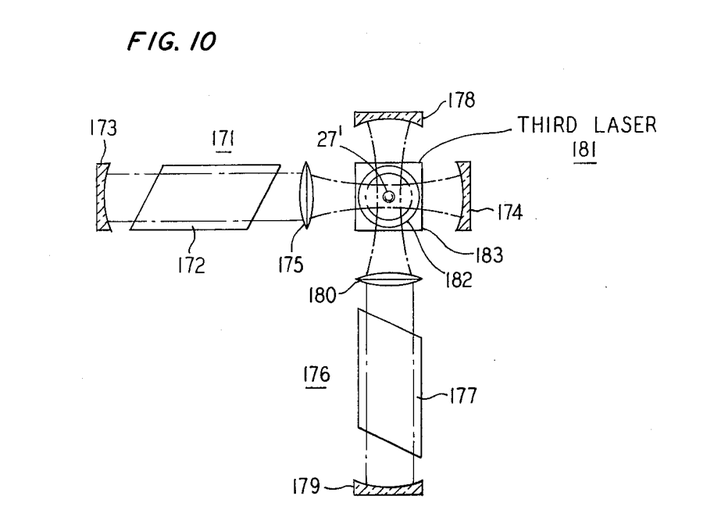
FIG. 10 is a partially pictorial and partially block-diagrammatic modification of the embodiment of FIG. 2A in which the particle is held in an optical potential well internal to a plurality of laser cavities.

Such an embodiment is shown in FIG. 10. The first laser 171 includes an active medium 172 and the optical resonator including reflectors 173 and 174 and the internal focusing lens 175. The second laser 176 includes an active medium 177, an optical resonator including reflectors 178 and 179 and the internal lens 180. The lenses 175 and 180 are disposed to provide the waists of the laser beams at the mutual intersection point of the axes of the two laser resonators. Optionally, a third laser 181 could be disposed with its resonator intersecting particle 27' in the third orthogonal dimension. Illustratively, it could include reflectors such as reflector 183 on the near side of the particle and an active medium 182. The lens corresponding to lenses 175 and 180 is not shown.

For a polyvinyltoluene particle 27', the active media 172 and 177 could be argon-ion active media appropriate for operation at $0.5145\mu$.

The embodiment of FIG. 10 operates to trap the particle 27' in an optical potential well by means of a centering effect upon such a particle 27' of Gaussian laser beams traveling in opposed directions. It will be recalled from the description of FIG. 4, and it is even more generally true, that the centering effect on a transparent particle of relatively high refractive index occurs because of the transverse gradient of radiation pressure. When such a particle is away from the point of maximum radiation pressure forces it experiences an unbalanced force, moving it toward the center of the Gaussian beam. The particle is not accelerated in any direction in the internal beams of the lasers 171 and 176 because the intensity of laser radiation pressure along any axis through the point of intersection of the laser axes is the same in both directions along such axis. For any one such bidirectional laser beam the centering forces are applicable in two orthogonal dimensions transverse to the direction of the laser beam. Therefore, the arrangement of FIG. 10 has some redundancy with respect to the centering in that any centering force of one beam is duplicated by a force of another orthogonal beam. In case of the use of only two lasers, stronger centering in one dimension is not a drawback for practical applications.

As in the preceding embodiments, the particle 27' is introduced to the optical potential well with the aid of a damping mechanism such as gas pressure damping, after which the gas is removed.

If it is then desired to fire particle 27' out of the optical potential well, as in the embodiment of FIG. 2, the direction of unbalanced radiation pressure can be chosen so that the path of the particle avoids physical obstruction by the optical resonators; or an appropriate hole can be provided in one of the reflectors.

In the latter instance, small perturbing light pulses introduced through one of the end reflectors to strike particle 27' can produce phase modulation of the laser along the axis of which the perturbing radiation is aligned and amplitude modulation of the orthogonally disposed laser, both modulations being produced by motion of the particle 27'.

High Energy Neutral Particle Accelerator

Figure 3:
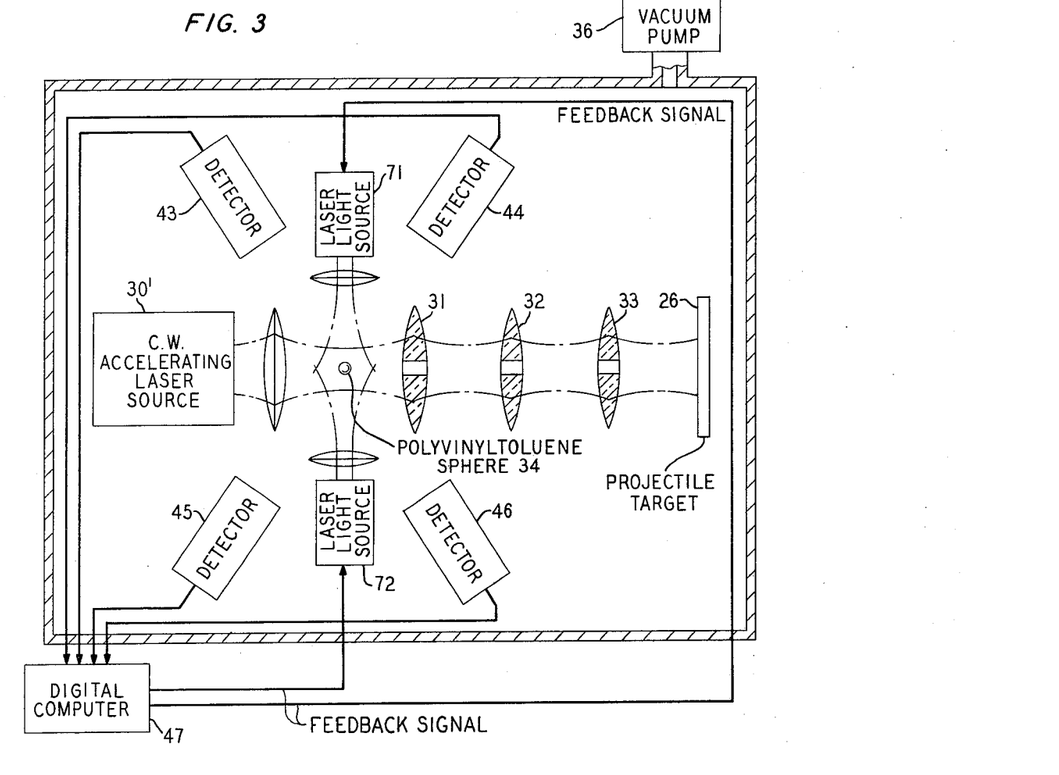
FIG. 3 is a partially pictorial and partially block-diagrammatic illustration of a high-energy acceleration embodiment of the invention.

The principles of the embodiments of FIGS. 2 and 2A can be extended to what I term multiple-stage acceleration by employing, in FIG. 3, an accelerating laser source 30' which is essentially continous-wave from the starting time of its operation or at least provides a sufficiently long optical pulse. The resulting accelerating light beam is then periodically refocused by the apertured lenses 31, 32 and 33 to provide a three-stage accelerating effect upon the neutral particle such as the illustrative polyvinyltoluene sphere 34. Sphere 34 is illustratively held in stable equilibrium before turn-on of source 30' by the continuous-wave laser light sources 71 and 72, which, as in the embodiment of FIG. 2, may be argon-ion lasers operating at 0.5145 micron at levels of about 0.1 watt each. All of the foregoing apparatuses are illustratively within vacuum chamber 61 evacuated by pump 36.

The operation of the embodiment of FIG. 3 should produce neutral particle velocities of the order of $1 \times 10^7$ cm/sec or higher, which is comparable with that presently known for micrometeorite or micrometeoroid particles.

Figure 9:
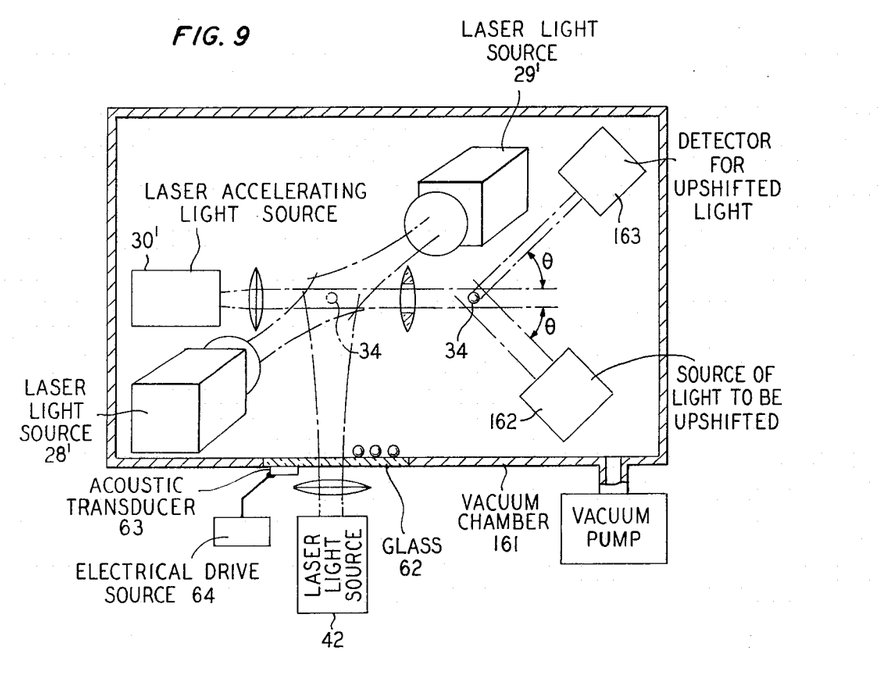
FIG. 9 is a partially pictorial and partially block-diagrammatic illustration of a modification of the embodiment of FIG. 3 to provide an output of light shifted upward in frequency.

It should be noted by way of extension of the principles of the embodiment of FIG. 3 that a reflective particle, or a particle having one flat surface accelerated to the velocities mentioned above, can produce a useful Doppler-shift in the frequency of light which can be reflected from such a particle at some point along its flight path. Such a modified embodiment is illustrated in FIG. 9. The particle 34 is held by the same arrangement as in the embodiment of FIG. 2A and is accelerated by the source 30' as in the embodiment of FIG. 3. After the particle 34 has reached a velocity of the order of $10^7$ centimeters per second, coherent light from a laser source 163 is directed obliquely to the path of particle 34 at the angle $\theta$. Light reflected from the particle at angle $-\theta$ with respect to the particle path and Doppler-shifted upward in frequency is received by a detector 163. Spherical particles retroflect a portion of the incident light from source 162. The retroflection occurs from the interior of the surface of the particle opposite the point of incidence. If the particle 34 is still accelerating at this point and if the laser beam from source 162 is broad enough and the detector aperture of detector 163 is large enough, then the detected light will be "chirped" in frequency.

It should be noted that radiation-pressure forces are sensitive not only to particle size but to particle shape. In brief, radiation-pressure will exert essentially a "weathervane effect" on elongated particles, such that the long dimension will be aligned along the direction of the radiation-pressure force, providing that oscillatory energy is removed from the particles. The weathervane effect has been observed in my recent experiments with levitation of dumbbell-shaped particles. Such an orientation of particles, which can be made stable and nonoscillatory with the aid of very weak gaseous viscous damping, may be very useful in the acceleration of a particle such as particle 34 in the modified embodiment of FIG. 9. For example, the side of the particle from which the light is reflected and Doppler-shifted could be made flat for greater reflection efficiency. This flat side would be orthogonal to the direction of particle elongation.

It is clear that the degree of damping provided would limit the maximum particle velocity. Therefore, an undamped, spherical particle accelerated in vacuum would be perferable if the highest possible particle velocity is desired.

Strong-Focusing Accelerator

Figure 5:
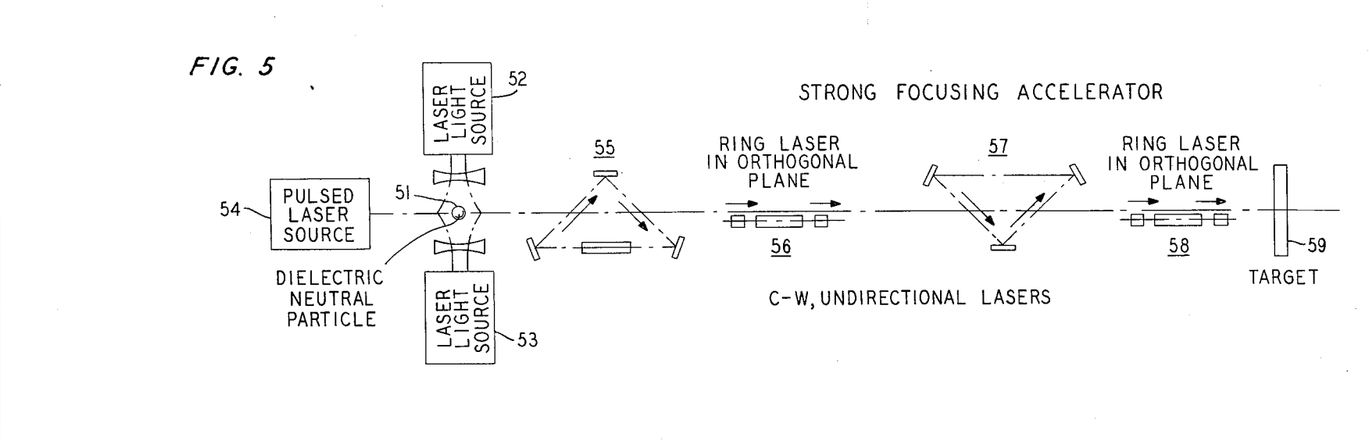
FIG. 5 is a partially pictorial and partially block-diagrammatic illustration of a strong-focusing neutral-particle accelerator according to my invention.

The principles of the embodiment of FIG. 3 are extended further in FIG. 5 in order to accelerate a dielectric neutral particle 51 which is either too small or insufficiently transmissive of the accelerating laser light to be held by radiation-pressure gradients producing the forces of FIG. 4. Indeed, the particle 51 can be an atom or a molecule if it is appropriately selected or, equivalently, the frequencies of the trapping and accelerating laser beams are appropriately chosen.

By way of general background on this point, it should be noted that the extension of the principles of my invention to accelerate or trap atoms or molecules opens many new possibilities. Although, in general, atoms and molecules are quite transparent to light, the successful application of my invention in this instance depends upon resonance interaction of the atom or molecule with the light. Thus, I employ laser light sources 52 and 53 which are tuned to a particular resonance radiation transition of the particle 51, so that the interaction cross section becomes dramatically greater than the geometric cross section. For example, an atom of sodium has a geometric cross section $\pi r^2$ of $1.1 \times 10^{-15}$ square centimeters; whereas, from the absorption coefficient, the cross section $\iota_T$ at temperature T for the $D_2$ resonance line at $\lambda = 0.5890\mu$ is $1.6 \times 10^{-9}$ cm$^2$, or about half of the wavelength squared for a temperature less than 40°K, which is in the region of negligible Doppler-broadening. The absorption and isotropic reradiation by spontaneous emission of resonance radiation in response to such radiation striking an atom results in an average driving force in the direction of the incident light.

For the purposes of the embodiment of FIG. 5, it is sufficient to say that substantial accelerations can be generated because of the enlarged cross section of the atom or molecule for interaction with resonance radiation. Nevertheless, the particle is so small that the force diagram of FIG. 4 is inapplicable in that no gradient of radiation pressure is apparent to the tiny particle and no inherent centering or focusing forces are exerted by the accelerating laser beam whether or not its transverse mode structure is appropriate. For this reason the pulsed laser source 54 can be employed merely to start the acceleration of particle atom or molecule 51; and its further acceleration as well as recentering can be provided by the oblique radiation-pressure forces supplied by unidirectional laser beams in ring lasers 55, 56, 57 and 58 along the path of the accelerated particle toward the ultimate target 59. It should be noted that ring lasers are not necessary and that all the desired beams could be supplied from the output of one laser by beam-dividers and mirrors. The ring lasers 55–58 are mutually rotated about the acceleration axis so that the net resultant of the transverse radiation-pressure accelerations of their unidirectional beams cancel. Yet at each oblique intersection of one of these beams with the accelerating particle 51 the particle 51 receives a further forward kick; that is, a further acceleration toward the target 59. The net result of the rotating transverse forces of the oblique ring laser beams which are also in resonance with a transition of the particle 51, is to confine the particle 51 to propagation along the desired path of acceleration in a helix or spiral. This lateral confinement is quite analogous to electronic or optical strong-focusing arrangements. The physical effect in this case, of course, is a combination of neutral atomic and optical interactions and is neither purely optical nor purely electronic in the sense of the prior strong-focusing art.

The apparatus of FIG. 5 can also provide a curved path of the particle 51 by gradually angularly shifting the orientations of the light beam paths. Specifically, a substantially circular path can be obtained. The circular path can be reduced in size by providing charge on each particle 51 or a magnetic moment for each particle 51 and then supplementing the technique of FIG. 5 with well-known techniques of electric or magnetic focusing.

Vacuum Deposition Assisted by Radiation Pressure

Figure 6:
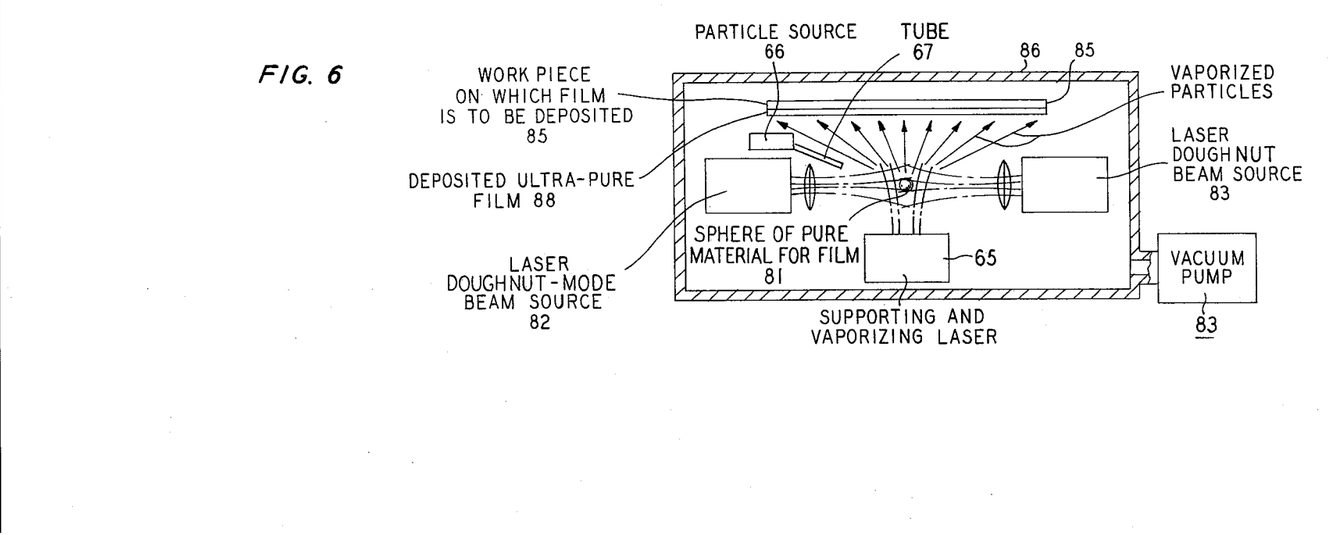
FIG. 6 is a partially pictorial and partially block-diagrammatic illustration of a vacuum deposition apparatus according to my invention.

The vacuum deposition apparatus shown in FIG. 6 is an extension of the controlled heating employed in the embodiment of FIG. 1A. While in FIG. 1A the controlled heating of a slightly-absorbing particle in an optical potential well provided an intense black-body (3,000°C) light source, in the embodiment of FIG. 6 the particle 81 in the potential well formed by diverging beams of appropriate transverse mode structure from laser sources 82, 83 and 65 is vaporized by a pulsed increase in power from lasers 82 and 83, or from laser 65, which helps to support particle 81 against gravity. In any event, the power increase of sources 82 and 83 should be symmetrical to prevent particle motion until vaporization is complete; and the power of laser 65 should start to increase after vaporization commences. The entire assembly is disposed in a cooled vacuum chamber 86 which is evacuated by a vacuum pump 87. If particle 81 is metallic or reflective, the appropriate transverse mode-structure is doughnut-shaped, as illustrated.

Alternatively, workpiece 85 could be an ultrapure piece of silicon (Si) on which a very thin silicon monoxide (SiO) layer is to be deposited. The lasers 82 and 83 could be any lasers providing Gaussian-mode substantially monochromatic light to which particle 81 is substantially transparent but slightly absorbing, e.g., 1.06 microns from a neodymium-ion (yttrium aluminum garnet host) laser. The vapor molecules and particles will tend to spread to cover workpiece 85 with a thin film 88 which will be ultrapure, since it has had no contact with a contaminating vessel during the vaporization process. Indeed, there will be no deleterious out-gassing from the walls of chamber 86 since they are held at light-helium temperature.

The technique of FIG. 6 can alternatively be used to support and position partially absorbing target particles containing deuterium, tritium and other elements required for thermonuclear fusion devices based on laser heating. This supporting and positioning technique can be used for particles in vacuum, gases or liquids.

New particles could illustratively be injected into the vaporization region by particle source 66 through a tube 67 or other appropriate particle guiding device.

Radiation-Pressure-Assisted Tensile Strength Testing

Figure 7:
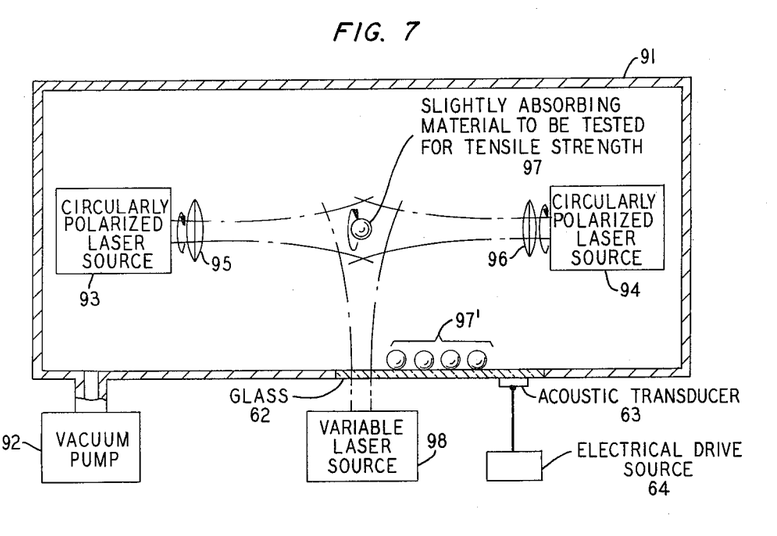
FIG. 7 is a partially pictorial and partially block-diagrammatic illustration of a tensile strength testing apparatus according to my invention.

Frictionless motion of a small spherical body of material in vacuum in a stable optical potential well formed by radiation pressure is of interest for many applications, for which the tensile-strength testing apparatus of FIG. 7 is illustrative.

In the embodiment of FIG. 7 the vacuum chamber 91 is evacuated to a high degree of vacuum by vacuum pump 92. Disposed within vacuum chamber 91 are the circularly polarized laser sources 93 and 94, which are used in part to form the stable optical potential well in cooperation with the lenses 95 and 96, respectively. The diverging beams intersect beyond their waists and overlap in a central region in which the stable optical potential well is formed.

Into that region is introduced, illustratively by techniques described above, a spherical body 96 of material which is to be tensile-strength tested. Specifically, the variable power laser source 98 lifts body 97 from glass plate 62 to the trapping region after Van der Waals' forces are broken by an acoustic pulse in the glass plate.

Although the body 97 is illustratively a substantially transparent and only slightly absorbing material, such as quartz ($SiO_2$) or silicon (Si) which is to be tensile-strength tested, it could also be a highly reflective and slightly absorbing material, provided other lasers, not circularly polarized, are cubically arranged with lasers 93 and 94 to form the optical potential well or provided the illustrated lasers use doughnut-mode beams as described above.

The key to this embodiment is uniform angular acceleration of body 97 based on optical absorption of circularly polarized light, where the torques from the circularly polarized radiation from sources 93 and 94 are additive. A photon has angular momentum; in circularly polarized light all of the angular momenta have the same sense. Absorption of the photons transfers the angular momenta. It will be noted that the light from source 93 is left-hand circularly polarized, and the light from source 94 is right-hand circularly polarized. The body 97 will spin away from the viewer at the top and toward the viewer at the bottom. Illustratively, the power of the sources forming the optical potential well is kept low enough that destruction by tensile failure occurs before vaporization of body 97. The angular velocity at failure will be directly related to the tensile strength of body 97, all other factors being equal, in view of the fact that the tensile forces within body 97 are centrifugal forces which are directly related to its angular velocity. The angular velocity can be measured by the Doppler shift of light scattered from the body 97 in response to obliquely incident light, e.g., the portion of light from source 98 that grazes the back surface of particle 97 and is scattered back in the direction of incidence.

This technique also provides a very sensitive measurement of absorption, since the angular velocity of body 97 is proportional to the time integral of the absorption.

Accordingly, I suggest the use of the embodiment of FIG. 7 to measure very low optical absorptions. Measurement of the angular velocity would be completed before tensile failure. In fact, absorptions so low that days elapsed to accelerate the particle could be measured extremely accurately.

Figure 8:
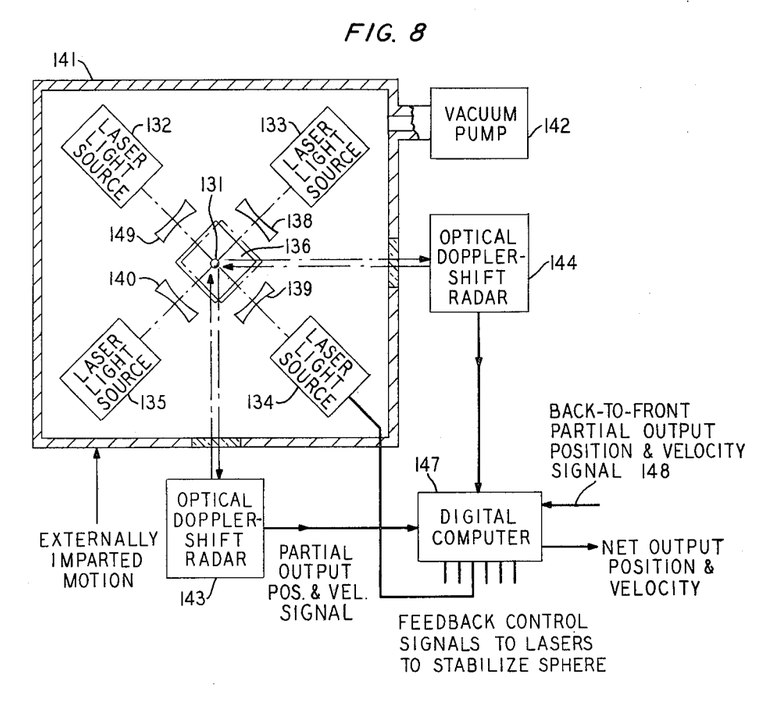
FIG. 8 is a partially pictorial and partially block-diagrammatic modification of the embodiment of FIG. 2 useful as an accelerometer or to measure gas pressures.

Radiation-Pressure Accelerometer for Inertial Guidance or Low Gas Pressure Measurements In the embodiment of FIG. 8, use is made of the extreme sensitivity of small particles in optical potential wells to small perturbations. In the embodiment of FIG. 8, a highly transparent body 131 of low loss, high quality optical quartz measuring about 3 microns in diameter is suspended in an optical potential well which is formed by six laser light sources 132, 133, 134, 135, 136 (in back) and 137 (in front and not shown). The laser beams are all shaped to be substantially diverging by suitable lenses such as lenses 149, 138, 139 and 140, the two other lenses not being shown.

It will be noted that this optical potential well is highly redundant as is desirable for control purposes, to be described hereinafter. A sufficient optical potential well for the transparent particle 131 could be formed by just two such sources arranged to be opposed along the same axis. The entire apparatus thus far described is enclosed in a vacuum chamber 141 evacuated by a vacuum pump 142.

Optical radar signals are directed at particle 131 from three external sources of which two, 143 and 144, are shown. The coherent light from these radars is directed through suitable windows 145 and 146 of vacuum chamber 141. The back-reflected light from particle 131 is received by the radars 143 and 144 and employed to produce a signal, based on Doppler shift, which indicates in an implicit form, the position and velocity of particle 131 in one coordinate along the axis of that radar. Three such Doppler-shift signals are applied to a digital computer 147 of conventional type. These signals include the signal for the motion of particle 131 into and out of the plane of the paper. This signal is indicated by the arrow 148. From these input signals the digital computer produces a net output position and velocity for the frame of reference in which particle 131 is disposed. Such an output signal is of the type desired from an accelerometer used in inertial guidance systems. In addition, the digital computer 147 produces six output signals which control the intensities of the lasers 132 through 137 to increase the forces tending to restore particle 131 to its equilibrium position. It is by such restoring forces, keeping particle 131 near its central position, that the highest accuracy will be obtained. It should also be noted that digital computer 147 can be readily programmed to compensate for the undamped (or slowly damped) components of motion of particle 131 or power fluctuations of the trapping beams. Use of a spinning particle 131 like particle 97 of FIG. 7 could convert the embodiment of FIG. 8 into a laser gyroscope for inertial guidance. Rotation velocity would be achieved and measured as in FIG. 7 and stabilized by an extension of the feedback circuits of FIG. 8.

A further embodiment of the invention essentially the same in appearance as that of FIG. 8 would employ that apparatus to measure very small gas pressures within the chamber 141. In this event, the digital computer 147 would be programmed to produce an output signal which was indicative of the gas pressure within chamber 141.

Such an apparatus would also be useful for measuring the extremely low gas pressures on the fringes of outer space, in which case a vacuum apparatus would not be necessary.

As should be apparent from the foregoing description of various embodiments of my invention, particle levitation with truly stable equilibrium is possible with a simple apparatus made up of only a single light beam source and a suitable cell for containing the particle. I call this apparatus an optical bottle.

Figure 12:
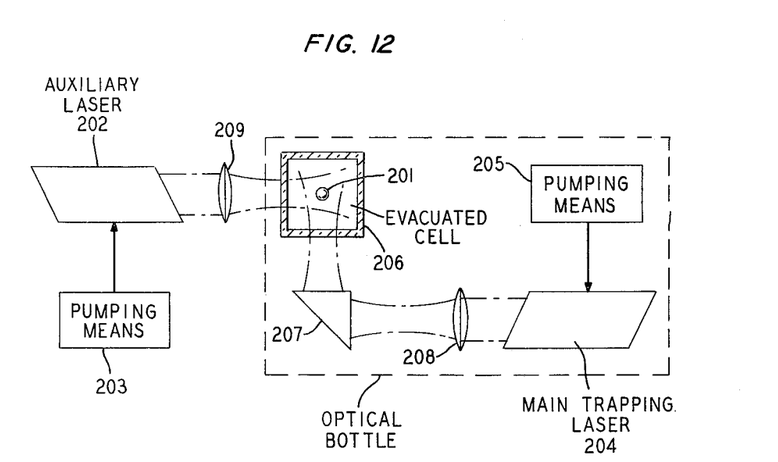
FIG. 12 shows a further modification of the embodiment of FIG. 2.

In the apparatus of FIG. 12, the optical bottle includes essentially only the particle 201 in cell 206 and a source that includes the main trapping laser 204 and its pumping means 205. The lens 208 and right-angle deflection prism 207 are not necessary, but were used in my tutorial particle levitation demonstrations for convenience in setting up the apparatus on the typical optical bench. Thus, laser 204 can be located at an arbitrary distance and orientation with respect to particle 201.

The auxiliary laser 202 and its pumping means 203 and lens 209 are not in any way a part of the optical bottle. Instead, they serve as a source of external disturbances of the particle 201 or as an additional control apparatus to facilitate the manipulation of particle 201. For example, the beam of laser 202 can push particle 201 to the limits of its optical bottle to demonstrate its trapping capability.

A fraction of a watt of laser light from laser 204 is sufficient to support a particle 201 about 20 micrometers in diameter against the force of gravity.

At the present time, the most practical way to introduce particle 201 of the order of 10 microns diameter into the optical bottle is to place it at rest on one of the interior surfaces of cell 206, turn that surface to be the bottom surface, partially evacuate the cell, direct the beam from laser 204 through that surface about the particle, and cause acoustic energy to propagate through the wall containing that surface to break Van der Waals' forces, which are about $10^4$ $g$'s (where $g$ is equivalent to the force of gravity) for a 20 micrometer particle. It is possible to introduce smaller particles into the system by spraying them in with an atomizer, which injects a gaseous stream carrying the particles.

A sharp external blow with a finger or other object is sufficient. The radiation pressure force then predominates over gravity in the diverging laser beam until particle 201 rises to the force equilibrium point. Damping of overshoot is provided by the remaining gas in cell 206.

If particle 201 is of high index relative to the damping medium and transparent, the laser 204 supplies a Gaussian beam to trap the particle laterally, as explained above with reference to FIG. 4.

If particle 201 is reflective or of relatively low index, the laser 204 supplies a doughnut-mode beam to trap the particle laterally, as explained above with reference to FIG. 1.

One illustrative source of a laser beam with a doughnut-shaped transverse mode is described in C. K. N, Patel U.S. Pat. No. 3,466,566, issued Sept. 9, 1969.

Once trapped, in my experiments, a particle 201 remained aloft as long as the light beam was focused on it. Moving the lens moved the focus and therefore moved the position of the particle very precisely. A 20 micrometer particle was photographed and visually observed by its own scattered light as it sat levitated a centimeter above the base plate.

The levitated particle was also observed precisely with a microscope focused directly on it. This capability was used in an interesting experiment to measure the strength of the optical restoring forces in the optical bottle. By hitting the particle with a second beam from auxiliary laser 202, it was determined how much power was needed eventually to push the particle right out of the bottle.

It was determined that the transverse restoring radiation pressure forces can be as high as $g/2$ for an off-axis particle when the vertical radiation pressure force is $g$.

In a single beam, the 90° reflected and refracted rays produce a set of interference rings, the spacing of which is precisely related to the particle diameter. Therefore, one can now precisely measure the diameters of very small transparent particles.

I claim:

1. Apparatus comprising
   at least one particle substantially nonabsorbing for a selected range of wavelengths of optical radiation and substantially larger in its cross-sectional dimensions than said wavelength,
   means for supplying to said particle a field force to balance other field forces including gravitational force on said particle, said supplying means including
   means for supplying about said particle a diverging coherent beam of said radiation in a traveling wave of substantial intensity in said wavelength range in a direction opposed to the resultant of said other field forces to produce a radition pressure force opposed to said resultant, and
   means other than said supplying means for applying at least one variable force on the particle to control the motion of said particle with respect to position within said beam.

2. Apparatus according to claim 1 in which the means for applying at least one variable force on the particle comprises
   means for launching the particle into the beam, including
   means comprising a dielectric plate for holding said particle by Van der Waals' forces and
   means for propagating acoustic energy through said plate to break said Van der Waals' forces, said supplying means supplying said beam having
   a transverse mode structure for centering said particle in said beam by transverse radiation pressure forces.

3. Apparatus according to claim 1 in which the means for controlling the motion of the particle with respect to the beam comprises
   a vacuum chamber surrounding said particle and containing a gaseous atmosphere and
   means for at least partially evacuating said vacuum chamber to provide a selected gaseous damping for said particle.

4. Apparatus according to claim 1 in which the means for supplying a set of balancing forces includes
   in addition to the aforesaid beam supplying means
   a second means for supplying about said particle a diverging coherent traveling wave beam of said radiation in said wavelength range, and the means for controlling the motion of the particle with respect to the beam includes
   a vacuum chamber surrounding said particle and containing a gaseous atmosphere and
   means for at least partially evacuating said vacuum chamber to provide a selected gaseous damping for said particle.

5. Apparatus according to claim 1 in which the means for controlling the motion of the particle with respect to the beam comprises
   means for supplying about said particle a second diverging coherent traveling wave beam of radiation of substantial intensity to unbalance the balancing forces and accelerate said particle beyond the effective field of the first beam.

6. Apparatus according to claim 1 in which the particle is reflective to the diverging coherent beam of radiation and the means for supplying to the particle a field force includes
   means for supplying about said particle a diverging coherent beam of radiation with a doughnut-shaped transverse mode.

7. Apparatus according to claim 5 including a plurality of apertured means for focusing said accelerating beam beyond the effective field of the first beam and for passing said particle as it accelerates.

8. Apparatus according to claim 1 in which the means for controlling the motion of the particle with respect to the aforesaid beam comprises
   means for supplying a plurality of unidirectional coherent optical beams intercepting said particle obliquely in its path as it accelerates and in varying orientations about said path to provide strong focusing of the particle in its path.

9. Apparatus comprising at least one particle substantially nonabsorbing for a selected range of wavelengths of optical radiation and substantially larger in its cross-sectional dimensions than said wavelength,
   means for supplying to said particle a field force to balance other field forces including gravitational force on said particle, said supplying means including,
   a plurality of lasers having resonators having mutually intersecting axes about said particle, said lasers supporting oscillations along said axes in Gaussian transverse modes for tending to center the particle with respect to said modes, at least one of said laser resonators having a horizontal axis, so that the centering tendency opposes the gravitational force.

* * * * *

UNITED STATES PATENT OFFICE
CERTIFICATE OF CORRECTION

Patent No. 3,808,550     Dated April 30, 1974

Inventor(s) Arthur Ashkin

It is certified that error appears in the above-identified patent and that said Letters Patent are hereby corrected as shown below:

In column 4, line 31, "without" should be --within--.

In column 11, line 42, "163" should be --162--.

In column 12, line 35, "$\iota_T$" should be --$\sigma_T$--.

In column 13, line 58, "light" should be --liquid--.

Signed and sealed this 24th day of September 1974.

(SEAL)
Attest:

McCOY M. GIBSON JR.
Attesting Officer

C. MARSHALL DANN
Commissioner of Patents